United States Patent [19]
Norling

[11] Patent Number: 4,985,963
[45] Date of Patent: Jan. 22, 1991

[54] METHOD AND DEVICE FOR SEPARATING SKELETON PARTS FROM A CARCASS

[76] Inventor: Lars-Erik Norling, S-262 00 Ängelholm, Valhallsvägen 49, Sweden

[21] Appl. No.: 424,273
[22] PCT Filed: Apr. 25, 1988
[86] PCT No.: PCT/SE88/00207
§ 371 Date: Oct. 26, 1989
§ 102(e) Date: Oct. 26, 1989
[87] PCT Pub. No.: WO88/08250
PCT Pub. Date: Nov. 3, 1988

[30] Foreign Application Priority Data
Apr. 27, 1987 [SE] Sweden ............... 8701726

[51] Int. Cl.$^5$ ............... A22C 15/00
[52] U.S. Cl. ............... 452/187; 452/141; 452/177
[58] Field of Search ............... 17/44.2, 44.1, 44.3, 17/24, 23, 45, 1 R

[56] References Cited

U.S. PATENT DOCUMENTS

| | | | |
|---|---|---|---|
| 3,533,131 | 10/1970 | Ivarsson | 17/23 |
| 3,774,265 | 11/1973 | Anderson et al. | 17/24 |
| 3,811,152 | 5/1974 | Herubel | 17/52 |
| 4,087,886 | 5/1978 | Aubert | 17/52 |
| 4,381,582 | 5/1983 | Korhonen | 17/44.3 |

FOREIGN PATENT DOCUMENTS

| | | |
|---|---|---|
| 0198329 | 11/1986 | European Pat. Off. |
| 0235001 | 9/1987 | European Pat. Off. |
| 440176 | 7/1985 | Sweden |

*Primary Examiner*—Willis Little
*Attorney, Agent, or Firm*—Ladas & Parry

[57] ABSTRACT

The skeleton bones in a carcass are separated from this in a continuous process course with the aid of supporting manual incisions and a mechanical force applied on the skeleton bones and the carcass, while the carcass is transported along a sliding conveyor hanging in its meat-hook. The speed and the force with which the carcass is transported are guided and controlled independent of each other. The carcass hangs on a meat-hook during the course without attachment so that it can move freely on the hook in all planes, while it is driven forward by means of a pushing arm applied across the carcass. The skeleton part of the carcass which is to be separated is attached by way of a supported meat-hook on the sliding conveyor while the rest of the carcass is driven along the conveyor.

6 Claims, 1 Drawing Sheet

METHOD AND DEVICE FOR SEPARATING SKELETON PARTS FROM A CARCASS

The present invention concerns a method with devices for separating skeleton parts from a slaughtered animal on an overhead conveyor in a cutting up plant.

With the method and the devices it is possible without structural changes in the cutting up plant to obtain a continuous production line for coarse cutting up. Compared with a traditionally manual method, the present invention increases the productivity, lowers the need of physical strength for the staff and increases the economical yield of the raw product by anatomic cutting out of the animal's muscles along the muscle membranes.

Meat is a proportionally expensive raw product and the margins of profit for the cutting up enterprises are usually very small in proportion to the raw product value. This has left its mark on the cutting up process, which today is one of the most work-intensive and physically demanding works within the industry. The demand for hygiene and for not causing damage on the meat during the cutting up and for simultaneously extracting the greatest possible share of meat from the skeleton parts today requires the use of the human eye and the muscle power and a skill acquired from several years of learning and practicing. Up to now due to the lack of one of the first conditions of automation and mechanization, the cutting up process in all essentials is quite manual.

The cutting up work of today is furthermore one of the most noticed from the labour-medical and work environment viewpoints. Today the industry also finds it more difficult to recruit and maintain available labour in view of the dangerous work environment for the butcher.

Contributions in the form of inter alia technical development for reducing work-demanding of cutting up methods are generally regarded as very urgent.

Above all the cutting up work of today is characterized in repeated work operations which require a relatively great physical strain and are often in inappropriate working positions. Separation of musculature from the skeleton parts or vice versa is one of the most strenuous and physically demanding work operations, since it most often entails lifting and pulling. To lift the whole or parts of a carcass from the overhead conveyor to the cutting up table is another demanding work operation. The most common cutting-up method is to perform the whole work either at/on individual cutting up tables or at/on cutting up plates along a conveyor band after the whole or parts of the carcass have been transmitted to the table from the overhead conveyor.

The method referred to by this patent application is based on the fact that the whole or a part of a carcass, e.g. a front of a hind quarter of cattle or a part thereof, is deskeletised during a team-work between the butcher and mechanical forces while hanging in a meat-hook as it is continuously transported along the overhead conveyor. The result becomes a substantially boneless part of the carcass and a separated part herefrom with skeleton bones, which is also continuously transported along the conveyor, while hanging in the meat-hook. Thereby a butcher obtains hanging pieces of boneless meat, e.g. a boneless hind quarter. It then is coarse-cut and requires relatively small physical strength while hanging. It is simplified to divide the already boneless piece of meat along the muscle membranes into natural muscle components without damaging the meat. Partly this can also take place in such a way that the mass of these parts are employed so that they by means of the gravity are pulled downwards and then fall on the cutting up table, a conveyor band, or similar. To separate carcasses from a hanging position requires great physical strength and the work with possible anatomic cutting up cannot take place with the same ease and precision. Lifts, jerks and drags are almost completely eliminated by the method for which a patent is sought.

The method and device defined by this application has been developed through intensive method works by practical tests at a Swedish cutting up plant.

The background for the application is that the devices for using the method have become extremely simple and uncomplicated from a mechanical point of view. The brilliance lies in the simplicity and, a continuous process. The method is based on the use of the overhead conveyors and meat-hooks already available in each cutting up plant. This entails a use without any additional investments or changes in the plant.

It is already known that by aid of mechanical devices the meat can be pulled apart to facilitate the cutting up operation. Korhonen patent SE No. 81 07 519-4 is the most similar. However, the present method discloses a continuous course of cutting up, where the carcass is transported along a conveyor, without being attached in a special way, whereby the skeleton bones are separated by supports in the bones and by way of meat-hooks which hang on the conveyor. No special prehensile claws are used. All parts of the carcass remain hanging on the conveyor.

The method sought is unique and it is effective in practice. The simplicity is the result of a long and intensive method-development work. For the person skilled in cutting up operations the method and device now almost seem to be obvious when seen in its simple use. For this reason and that the simple method, in spite of the long history of cutting up meat, is unique, the method has an inventive level which is very high for the industry to use it.

DETAILED DESCRIPTION OF THE INVENTION

A part of a slaughtered animal (below called the carcass), e.g. one half of a cleft pig or a front or hind quarter of cattle hangs in a meat-hook on an overhead conveyor.

The carcass is transported on the overhead conveyor to working stations in a continuous course, starting with that an incision is made in the carcass in a special way at one or several basic working stations and ending with that the carcass hangs on the conveyor in meat-hooks, partly separated in skeleton parts and partly in skeleton-free pieces of meat; e.g. a hind quarter from cattle which has been separated on one hand in the skeleton parts comprising pelvis-bones with spine, thigh-bones and shin-bones, respectively, and which on the other hand has been released from these skeleton parts. The hind quarter as separated hangs in one single piece in a meat-hook on the conveyor. Another example consists of a front quarter from cattle which after the process remains hanging in meat-hooks on the conveyor, separated in e.g. rib and neck bones, shank with shoulder-blades and boneless breast with chuck and middle ribs and boneless shank and shoulder meat.

Figure 1:
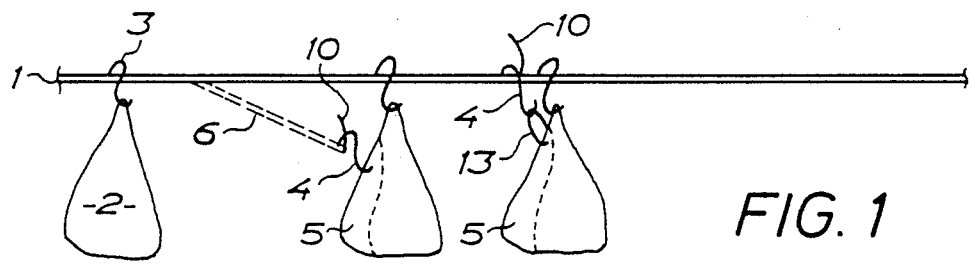
FIG. 1 is a side view of parts of the device according to the invention form which it appears how a second meat-hook is attached in the carcass.

Between the basic working stations and the end results exemplified above the carcass has passed one or several working stations, where the skeleton parts have been separated while the carcass hanging in its hook is transported along the conveyor. This patent application comprises a method and devices for this separation according to the following:

On the conveyor 1 shown in FIG. 1 the carcass 2 is transported hanging on the meat-hook 3 to a working station. At this station a second meat-hook 4 is attached directly or by way of a joint 13 to a part 5 of the carcass which is to be separated. e.g. the pelvis-bone. The second meat-hook 4 attached thereto is then attached on the same conveyor as the carcass or on another conveyor. This takes place in such a way that a portion of the conveyor 6 is lowered to a suitable height for the hook or the hook 4 is lifted to the carcass on the conveyor. The meat-hook 4 is held statically on the conveyor by means of a support 10.

Figure 2:
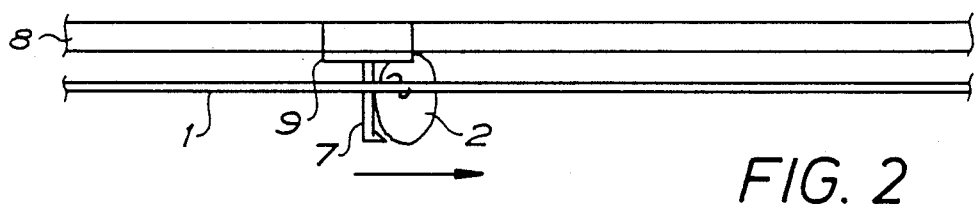
FIG. 2 is a top view of the device with a pushing arm in position at a carcass.
Figure 3:
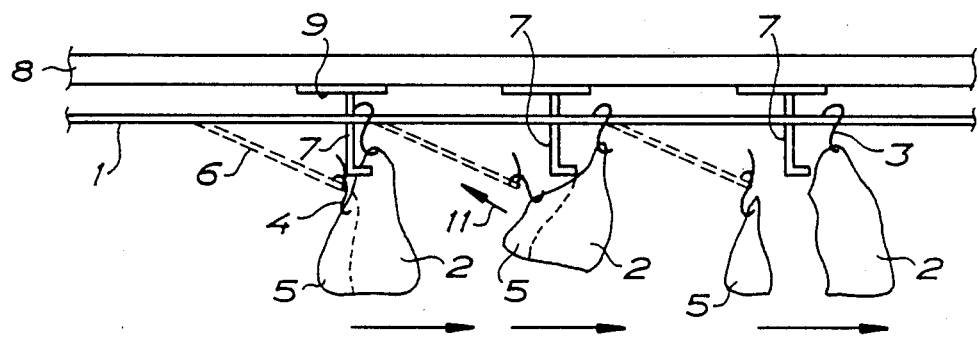
FIG. 3 is a side view of the device which shows the separation method.
Figure 4:
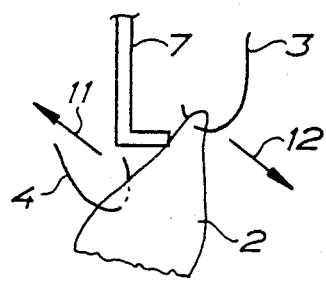
FIG. 4 is a detail view of the device showing the forces which are active when the pushing arm effect the carcass.

In the next instant as shown in FIGS. 2 and 3 either a pushing arm 7 or a pulling 7 (below called the arm) is applied on the carcass or on the meat-hollow. The arm runs along the conveyor in an angle of 90 degrees towards this.

The arm is applied on a driving means 8.

The arm transports the carcass 2 onwards along the conveyor. A load cell 9 is connected to the arm or the driving means. This senses the force which is required in order to transport the carcass.

The part 5 of the carcass (e.g. the shank-bone or the pelvis-bone) applied on the hook 4 is now subjected to a tensile force 11, which with or without contributing incisions between the part 5 and the remaining carcass 2 leads to the fact that the part 5 is released from the carcass 2 and remains hanging on the meat-hook 4 on the overhead conveyor.

The arm 7 positions 30 to 60 cm down on the carcass, counted from the top side of the conveyor. It forces the carcass to remain on the meat-hook, while the carcass and the part of the carcass to be released are exposed to the driving force of the arm.

The patent application also comprises the arm and the arm functions as support by way of the force 12 for the force 11, which would otherwise have pulled the carcass off from the hook.

The patent application also comprises an arrangement that a driving means 8 which is separated from the overhead conveyor 1 is provided to drive the pushing arm or the pulling arm back and forth along the overhead conveyor.

Start and stop of the driving means are regulated partly manually and partly by way of mechanical or inductive limit position indicators.

The driving means can be started and stopped by operations from the butcher. When the arm 7 has reached its outermost limit position it automatically returns.

The patent application also comprises the fact that the driving force and the speed can be regulated independently of each other by way of the load cell, so that they do not exceed the limit when tear damages occur on the meat in the carcass. The application also comprises the fact that the arm stops but continues to exert a maximum allowed drawing force on the carcass, when a force greater than the maximum allowed is required in order to continue the transport along the conveyor.

The speed with which the carcass is driven is adjustable and it is completely independent of the allowed maximum tensile force. As long as the force required falls below the maximum allowed the carcass is driven with the adjusted speed.

The above-mentioned circumstances entail adjustment partly due to the operator's/butcher's ability and skill and partly to the properties of the meat so that the meat will not be damaged.

I claim:

1. A method for continuous separation of skeleton parts from a carcass comprising the steps of:
   hanging the carcass on a first meat hook provided on an overhead conveyor for transporting the carcass;
   attaching a second meat hook to a part of the carcass to be separated, said second meat hook being held on a portion of the conveyor through a support means; and
   pressing an arm on the carcass for forcing the carcass in the running direction of the conveyor away from the second meat hook, whereby the part of the carcass is separated from the carcass.

2. A device for continuous separation of skeleton parts from a carcass comprising:
   a first meat hook provided on an overhead conveyor whereby to hang the carcass thereon;
   a second meat hook provided to attach on a part of the carcass to be separated, said second meat hook being held on the conveyor; and
   an arm for pressing the carcass in the running direction of the conveyor and thereby forcing the part of the carcass attached on the second meat hook separated from the carcass.

3. A device according to claim 2, wherein said second meat hook is held on another conveyor different from the one for hanging the carcass.

4. A device according to claim 2, wherein said second meat hook is indirectly attached to said part of the carcass to be separated through a joint.

5. A device according to claim 6, wherein said arm extends downwardly about 30 to 60 cm from the top part of the carcass.

6. A device according to claim 2 or 3, wherein said second meat hook is held steadily on the conveyor through a support means.

* * * * *

UNITED STATES PATENT AND TRADEMARK OFFICE
CERTIFICATE OF CORRECTION

PATENT NO. : 4,985,963
DATED : January 22, 1991
INVENTOR(S) : Lars-Erik Norling

It is certified that error appears in the above—identified patent and that said Letters Patent is hereby corrected as shown below:

column 4, line 58, cancel "part", insert --side--;
cancel "carcass", insert --conveyor--.

Signed and Sealed this

Twenty-ninth Day of December, 1992

*Attest:*

DOUGLAS B. COMER

*Attesting Officer*   *Acting Commissioner of Patents and Trademarks*